United States Patent [19]

Bertozzi

[11] 4,376,193

[45] Mar. 8, 1983

[54] ARYL AMINE TERMINATED POLYSULFIDE POLYMERS, RELATED COMPOUNDS AND PROCESSES FOR THEIR PREPARATION

[75] Inventor: Eugene R. Bertozzi, Yardley, Pa.

[73] Assignee: Thiokol Corporation, Newtown, Pa.

[21] Appl. No.: 114,438

[22] Filed: Jan. 22, 1980

Related U.S. Application Data

[62] Division of Ser. No. 66,214, Aug. 10, 1979, Pat. No. 4,238,585.

[51] Int. Cl.$^3$ .............................................. C08G 18/38
[52] U.S. Cl. ................... 528/59; 260/453 A; 260/455 A; 528/60; 528/62; 528/64
[58] Field of Search .............. 528/59, 60, 62, 64; 260/453 AR, 455 A

[56] References Cited

U.S. PATENT DOCUMENTS

| | | | |
|---|---|---|---|
| 2,347,840 | 5/1944 | Nygaard | 260/79 |
| 2,606,173 | 8/1952 | Fettes | 260/79.1 |
| 3,386,963 | 6/1968 | Santaniello | 260/77.5 |
| 4,166,874 | 9/1979 | McCready | 428/35 |

FOREIGN PATENT DOCUMENTS 1425684  5/1974  United Kingdom .

*Primary Examiner*—Maurice J. Welsh
*Attorney, Agent, or Firm*—Richard J. Sheridan; Gerald K. White

[57] ABSTRACT

Fully and partially aryl amine terminated polysulfide polymers and processes for their preparation and use are disclosed. The fully aryl amine terminated products are curable with isocyanates to high molecular weight polymers and are thus useful in molding and casting as well as in sealants. The partially aryl amine terminated polymers may be further reacted with polyisocyanates to form thiol terminated polysulfide polymers containing urea chain segments. These compounds are curable in the fashion of standard polysulfide polymers to form firmer polymers. The partially aryl amine terminated polymers may be also chain extended with isocyanate terminated urethane prepolymers. These block copolymers may be cured by standard SH terminated polysulfide polymer cure methods to prepare sealants of exceptional resiliency and weather resistance.

5 Claims, No Drawings

ARYL AMINE TERMINATED POLYSULFIDE POLYMERS, RELATED COMPOUNDS AND PROCESSES FOR THEIR PREPARATION

This is a divisional of application Ser. No. 066,214, filed Aug. 10, 1979, now U.S. Pat. No. 4,238,585.

BACKGROUND OF THE INVENTION

This invention relates to the art of polysulfide and urethane polymers, processes for their preparation and cure and methods for their use.

The high molecular weight polysulfide polymers prepared in the known commercial polysulfide polymer synthesis bear hydroxyl chain terminals. When these high molecular weight polymers are chemically split to form lower molecular weight solids or liquid polysulfide polymers, the resultant macromolecules are thiol terminated. These materials, using presently available cure methods, are quite satisfactory and are commercially successful. Alternative cure methods continue to be of interest because such alternative cures hold the potential for even better properties and new uses for the novel products produced thereby. The introduction during the initial polysulfide polymer condensation of variously functionized monomers so as to produce moderate molecular weight products amenable to alternative cures has been explored previously. The introduction of unsaturation, hydroxyl, carboxyl, alkylamino, amide and aldehyde functions has been examined. The cure of the hydroxyl or unsaturation containing polymers has not proven commercially practical. The other groups are reactive with sodium polysulfide and the conditions of the initial polysulfide condensation reaction cause their loss. No direct method of splitting the initially formed, very high molecular weight polysulfide polymers to lower molecular weight products having other than thiol terminals has previously been demonstrated as practical.

Several methods of converting hydroxyl or thiol terminated polysulfide polymers to amine terminated polysulfide polymers which may then be reacted with epoxy polymers to form cured solid resins have been proposed. U.S. Pat. No. 3,322,851 illustrates the preparation of compounds of the formula

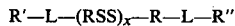

wherein L is —O— or —S—; R' and R" are the specific alkylamino groups.

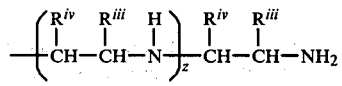

z being selected from 0, 1, 2, 3 or 4; $R^{iii}$ and $R^{iv}$ being the same or different and being radicals selected from hydrogen, normal and branched alkyl and substituted or unsubstituted aromatic radicals; x is a positive number greater than 1; and R is an intervening polyvalent organic radical. Here the alkyl amine functionality is introduced subsequent to the polysulfide condensation reaction and any desired molecular weight adjustments.

U.S. Pat. No. 3,331,816 illustrates the preparation of alkylamino terminated polysulfide polymers of the formula:

wherein L is —O— or —S— and wherein $R^i$ and $R^{ii}$ are the azomethino amino groups

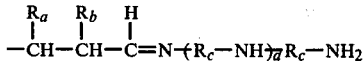

wherein $R_c$ is an alkylene group having up to 6 carbon atoms, d is an integer selected from 0, 1, 2, 3, 4 and 5; y and z are selected from 1, 2, 3 and 4; $R_a$ and $R_b$ are the same or different and are radicals chosen from the group hydrogen, normal and branched alkyl having up to 6 carbon atoms and substituted to unsubstituted alkylene-aromatic, aromatic and alicyclic radical, R is an intervening group selected from the class of intervening groups shown in U.S. Pat. No. 3,335,201, Tables I and II; and x is a positive number greater than 1. Here again, the amino terminals are introduced subsequent to the initial polysulfide synthesis and desired molecular weight adjustment.

U.S. Pat. No. 3,335,201 also illustrates amino terminated polysulfides of the structure:

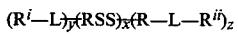

wherein L is —O— or —S— and wherein $R^i$ and $R^{ii}$ are the phenol amino groups:

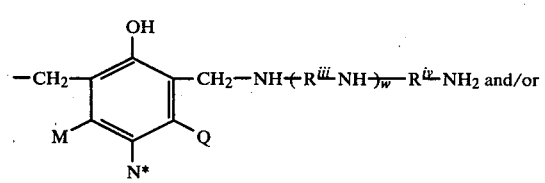

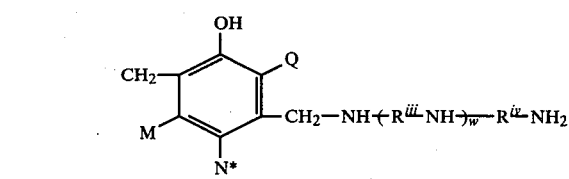

wherein M, N* and Q may be hydrogen, lower alkyl, and lower alkyl ether or thio ether groups, w is an integer that is one of 0, 1, 2, 3, 4, 5, and 6; y and z being one of 1, 2, 3 and 4; $R^{iii}$ and $R^{iv}$ are the same or different and are chosen from the group consisting of normal and branched alkyl radicals, alkyl ether or thio ether radicals, and substituted and unsubstituted aromatic and alicyclic radicals; x is a positive number greater than 1 and R is an intervening polyvalent organic radical. The teachings of the specification indicate that benzyl or phenyl alkylene amines are intended by including aromatic moieties among the possible identities of $R^{iii}$ and $R^{iv}$. In this patent, also, introduction of the amine terminals is after the polysulfide condensation and any desired molecular weight adjustments. It will be noted that the structure of all the above suggested amine terminals is significantly different from those of applicant's instant invention. In addition, it is noted that all the above compositions are cured with epoxy type cures. As the above compositions are all alkyl amine terminated, they would not suggest themselves as useful curing agents in the urethane art. While alkyl amine compounds are useful catalysts in urethane cures, their high reactivity and consequent short "pot life" renders them generally not useful as urethane cure agents per se.

The reaction of liquid thiol terminated polysulfide polymers with isocyanates is well known. British Pat. No. 1,475,115 and the publication Modification of Urethane Thermo Elastomers by Polysulfide Polymers by Cherkasova et al in Sintez i Fiziko-Khimiya Polimerov, Vol. 19, pages 72–76, 1976 are recent examples. Other patents concerning mercaptan containing polyurethane compositions and curable liquid polythiopolymercaptanpolyurethane polymers are U.S. Pat. Nos. 3,446,780 and 3,440,273.

The present invention provides methods of producing aryl amine terminated polysulfide polymers in either liquid or solid form either by direct synthesis or by conversion of a previously synthesized hydroxyl terminated high molecular weight polysulfide polymer without requiring a separate molecular weight adjustment step.

SUMMARY OF THE INVENTION

The invention provides in a composition aspect a compound of the formula I:

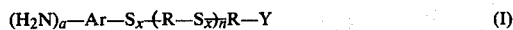

$$(H_2N)_a-Ar-S_x-(R-S_x)_nR-Y \qquad (I)$$

wherein Y is —SH or $S_x$—Ar—$(NH_2)_a$; Ar is an $a+1$ valent radical derived by removal of $a+1$ nuclear hydrogens from a substituted or unsubstituted aryl moiety either carbocyclic or heterocyclic and having 1 or 2 aromatic rings; R is a hydrocarbon, oxahydrocarbon or thiahydrocarbon radical; a is 1 or 2; n is about 4 to $k \times 10^3$ wherein k is 1 to about 10; and x is from about 1.8 to about 4.

The tangible embodiments of this composition aspect of the invention possess the inherent physical properties of being liquids or soft solids, being substantially nonvolatile and being substantially insoluble in water and saturated hydrocarbon solvents, such as hexane or petroleum ether.

The tangible embodiments of this composition aspect of the invention possess the inherent applied use characteristic of being curable or cross-linkable through the use of poly valent compounds reactive with aryl amine functions such as epoxy compounds, polybasic acid anhydrides and polyisocyanates or through a combination of these compounds and conventional polysulfide curing agents to high molecular weight solids having excellent resistance to oils and greases and to hydrolysis. This evidences their usefulness in the formation of films, cast or extruded objects and in the formulation of sealants having high water and solvent resistance.

Preferred embodiments of the compositions of formula I are those wherein Ar is a radical derived from benzene or alkyl substituted benzene, a is 1 and n is about 4 to about 23. Special mention is also made of those embodiments of formula I wherein Y is —$S_x$—Ar—$(NH_2)_a$ and of those embodiments wherein Y is —SH most particularly in both cases wherein n is 4 to about 23.

The invention further provides a composition of the formula II:

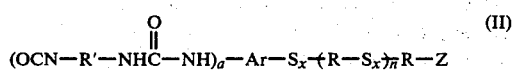

$$(OCN-R'-NHC-NH)_a-Ar-S_x-(R-S_x)_nR-Z \qquad (II)$$
$$\qquad\quad\ \ \overset{O}{\underset{\|}{}}$$

wherein Ar; R; a; n and x are as defined for formula I; Z is

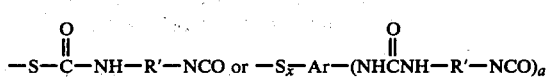

$$-S-\overset{O}{\underset{\|}{C}}-NH-R'-NCO \text{ or } -S_x-Ar-(NHCNH-R'-NCO)_a$$

and R' is a polyvalent aliphatic, aromatic, or aliphatic aromatic radical or when taken together with the

$$-\overset{O}{\underset{\|}{C}}NH-$$

and —NCO moieties is the residue of an isocyanate terminated polyurethane prepolymer.

The compositions of this aspect of the invention possess the inherent applied use characteristic of being curable with standard Zerewitinoff active hydrogen containing polyurethane prepolymer curing agents thereby evidencing their usefulness in preparing films, cast and extruded objects and in formulating sealants having high water and solvent resistance.

The invention also provides compositions of formula III:

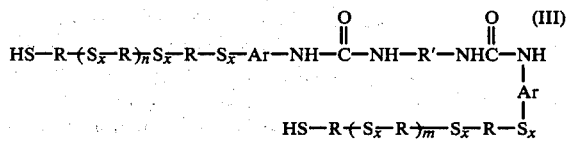

$$HS-R-(S_x-R)_n S_x-R-S_x-Ar-NH-\overset{O}{\underset{\|}{C}}-NH-R'-NH\overset{O}{\underset{\|}{C}}-NH \qquad (III)$$
$$\qquad\qquad\qquad\qquad\qquad\qquad\qquad\qquad\qquad\qquad\qquad\ \ |$$
$$\qquad\qquad\qquad\qquad\qquad\qquad\qquad\qquad\qquad\qquad\quad\ \ Ar$$
$$\qquad\qquad\qquad\qquad\qquad\qquad\qquad\qquad\qquad HS-R-(S_x-R)_m-S_x-R-S_x$$

wherein Ar; R; R'; n and x are as defined for formulas I and II and m is about 4 to about $k \times 10^3$ wherein k is 1 to about 10.

The tangible embodiments of this composition aspect of the invention possess the inherent applied use characteristics of being curable to solids by standard polysulfide polymer oxidative cure agents thereby evidencing their usefulness in forming films, cast and extruded objects as well as in the formulation of sealants.

The invention also provides in a composition aspect an article of manufacture which comprises a cured object comprising the reaction products of a polyurethane prepolymer curing agent and a compound of formula I or a compound of formula II.

The invention also provides a process for the preparation of a compound fo formula I which comprises treating a compound of the formula IV:

$$(O_2N)_a-Ar-Hal \qquad (IV)$$

wherein Hal is Cl, Br or I; and Ar and a are as defined for formula I; together with a compound of the formula V:

$$Hal-R-Hal \qquad (V)$$

wherein R is as defined for formula I and Hal is as defined for formula IV; with sodium polysulfide in a substantially aqueous medium to produce a compound of formula I wherein Y is —$S_x$—Ar—$(NH_2)_a$. If a compound of formula I wherein Y is —SH is desired, the product of formula I wherein Y is $S_x$—Ar—$(NH_2)_a$ so formed may be treated either with SH− in the presence of $SO_3^=$ or with a conventional thiol terminated liquid polysulfide polymer.

The invention also provides a process for the preparation of a compound of formula I which comprises treating a compound of the formula V with sodium polysulfide in a substantially aqueous medium to prepare compound of formula VI:

HO—R—[S$_x$—R]$_{n'}$S$_x$—R—OH    (VI)

wherein n' is sufficient to give molecular weight values of from about $1 \times 10^4$ to $k \times 10^5$ wherein k is 1 to about 10; and R and x are as defined for formula I hereinabove; and treating a compound of formula VI so produced with a compound of formula VII:

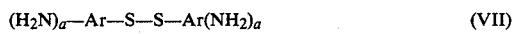

(H$_2$N)$_a$—Ar—S—S—Ar(NH$_2$)$_a$    (VII)

wherein Ar and a are as defined for formula I hereinabove.

The invention also provides in a process aspect a process for the preparation of compounds of formula II

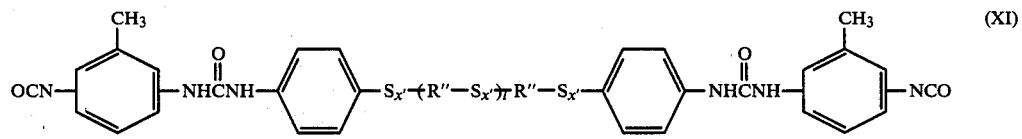

which comprises treating a compound of formula I with a compound of formula VIII:

OCN—R'—NCO    (VIII)

wherein R' is as defined for formula II.

The invention also provides a process for the preparation of compounds of formula III which comprises treating a compound of the formula I wherein y is a thiol terminal with the correct stoichiometric amount of a compound of formula VIII.

The invention also provides a curable composition which comprises a compound of formula VIII and compound of formula I wherein Y is —S$_x$—Ar—(NH$_2$)$_a$.

The invention also provides a curable composition which comprises a compound of formula II and a poly(Zerewitinoff active hydrogen containing) organic compound.

The invention also provides a cured elastomer which comprises the reaction product of a compound of formula I and a compound of formula VIII.

The invention also provides a cured elastomeric product which comprises the reaction product of a compound of formula II and an organic compound having a plurality of Zerewitinoff active hydrogens.

The invention also provides a cured elastomer which comprises the reaction products of a compound of formula III and a known polysulfide polymer oxidative curing agent.

The invention also provides a curable composition which comprises a compound of formula III and a conventional polysulfide polymer oxidative curing agent.

DESCRIPTION OF THE PREFERRED EMBODIMENT

The manner of making and using the compositions of the invention will now be described with reference to specific embodiments thereof, namely, a liquid aminophenyl terminated polysulfide polymer based on bis-(2-chloroethyl) formal, having an average sulfur linkage rank of 2.25 and an average molecular weight exclusive of arylamine terminals of about 2000 (IX), a compound of formula I wherein Y is —S$_x$—Ar—(NH$_2$)$_a$; a liquid thiol terminated polysulfide urethane block copolymer (X) of the formula:

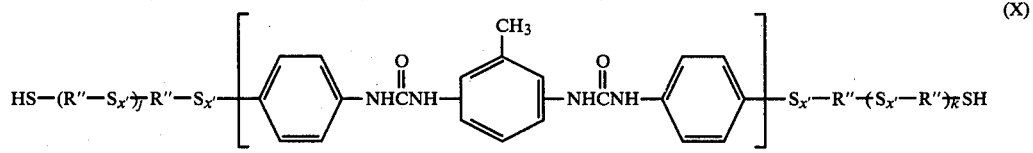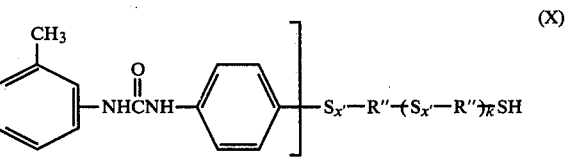

(X)

wherein X' is about 2.25; j and k together are sufficient to give the polysulfide portion of the molecule outside the bracketed portion a molecular weight of about 4000; bonding to the tolylene moiety is at the 2, 4 or 2, 6 position; and R" is —CH$_2$CH$_2$—OCH$_2$O—CH$_2$CH$_2$—, a compound of formula III; and a compound of the formula XI:

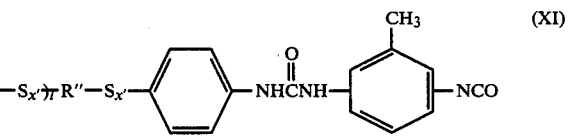

(XI)

wherein x' is about 2.25; l is sifficient to give an average weight of about 2000 atomic weight units to the molecular backbone portion between the terminal units which commence with the phenylene moieties; bonding to the tolylene moieties is at the 2, 4 or 2, 6 positions; and R" is —CH$_2$CH$_2$—OCH$_2$O—CH$_2$CH$_2$—, a compound of formula II.

To prepare IX, bis-(2-chloroethyl) formal may be treated with sodium polysulfide at elevated temperatures, conveniently from slightly above room temperature to about 90° C., preferably about 85° C., in a polar solvent, conveniently water, in the presence of strong base, conveniently sodium hydroxide, and in the presence of sufficient soluble magnesium salt to precipitate magnesium hydroxide for nucleating curd formation in the polysulfide latex and an alkyl aryl sulfonate dispersing agent, over a short period of time, conveniently about one hour, to form a latex. The latex so formed may then be coagulated and solids separated from the liquid reaction medium by settling and decantation of the supernatant liquid. The solid residue may be then washed with portions of water until free of sulfide reaction with lead acetate test paper. The washed latex suspended in a suitable reaction medium, conveniently water, may be treated with diamino diphenyl disulfide (VIIa), conveniently with the aid of a miscible solvent in which the diamino diphenyl disulfide is dissolved, such as methanol, and addition of such solution to the latex suspension at temperatures which may vary from room temperature to about 80° C. during the mixing process and then, conveniently, at about 80° C., although one skilled in the art will recognize that the exact temperature is not particularly critical, until a sample of the reaction mixture shows the separation of a second liquid phase with no residual solid upon acidification, conveniently with acetic acid. If desired, the aryl amine terminated polymer (IX) may be treated with a stoichiometric quantity of toluene diisocyanate (VIIIa), that is, 1 isocyanate to 1 amine to prepare a high molecular weight chain extended polymer which may then be split at the disulfide linkages in the usual fashion by treatment with NaSH and $Na_2SO_3$ to prepare X. If desired, X may also be prepared starting from a liquid thiol terminated polysulfide polymer (XII) having the dichloroethyl formal based backbone. XII may be treated with (VIIa) in a fashion similar to that described for the preparation of IX, conveniently in this instance, the ratio of diamino diphenyl disulfide to thiol groups will be 1:2, although it may be greater whole number multiples, if lower molecular weight fragments are desired. The resultant product of this treatment (XIII) will be a compound of formula I wherein Y is SH. XIII may be treated with VIIIa at a 1:1 isocyanate to amine ratio to prepare X.

To prepare XI, IX may be treated with VIIIa at about a 2:1 isocyanate to amine group ratio. The reactions herein, unless otherwise specified, may be performed neat or in the presence of suitable inert solvents or suspending agents for one or more of the reactants. The temperature in most cases is also not especially critical and unless otherwise specified, they may be performed at room temperature or at temperatures slightly elevated above that point. In most illustrative examples, it will be understood that solvents, temperatures and reaction times are illustrative and that their variation will be well within the skill of the ordinary chemist. One of skill in the art will also recognize that in addition to the diamino diphenyl disulfide illustrated for the preparation of IX and the various reaction products thereof, one may substitute other amino substituted diaryl disulfides and obtain analogous compounds of formula I. These compounds obviously may then be converted by processes analogous to those described herein to prepare compounds of formula II or III. Similarly, one skilled in the art will recognize that in the reaction of initially formed high molecular weight polysulfide polymer with diamino diphenyl disulfide varying the relative proportions of diamino diphenyl disulfide, or, for that matter, any of the diaryl amino disulfides to that of the polysulfide polymer, will permit control of the molecular weight of the aryl amine terminated polysulfide polymer so produced.

It will also be obvious to one of skill in the art that in addition to the toluene diisocyanate VIIIa illustrated for the preparation of compounds X and XI, other monomeric isocyanates or polyurethane prepolymers having at least 2 free isocyanate functionalities may be employed to prepare analogous compound formulas II and III.

Similarly, it will be obvious that compounds of formula II wherein Z is

may be prepared by treating compounds of formula I wherein Y is SH with a suitable diisocyanate with a proportion of about 2-NCO groups to the total $-NH_2$ and $-SH$ group content.

An alternative synthesis of compounds of formula I wherein Y is $-S_x-Ar-NH_2)_a$ is to introduce a compound of the formula IV in a standard polysulfide polymer synthesis. It is readily apparent that IV will act as a chain stopper. Surprisingly the excess inorganic polysulfide always present in such synthesis as it is required to attain high molecular weight appears to serve as a reductant to the nitro chain terminals, reducing them to amino groups. That reduction does not occur prior to introduction of the residue of IV as a chain terminal is further evidenced by the observation that p-chloroaniline does not introduce aminophenyl terminals if employed in analogous fashion to IV. Control of the ratio of compound IV to compound V will obviously allow statistical control of the molecular weight of the polymer formed. Obviously, in a variant of this synthesis, the aryl amine terminated polysulfide polymer so formed may be split with NaSH and $Na_2SO_3$, or their equivalents, to produce compounds of formula I wheren Y is $-SH$.

One skilled in the art will also recognize that in another variant of this synthesis; the aryl amine terminated polymer so formed may be treated, conveniently at elevated temperature, preferably, but not critically, at about 90° C., with a conventional liquid thiol terminated polysulfide polymer, conveniently of about the same average molecular weight, to prepare compounds of Formula I wherein Y is $-SH$.

In the processes for the use of the compounds of the invention, standard methods of compounding, if desired, and of application and cure are contemplated. If desired, sealant compositions, either 2 part using separately packaged curing agents, or 1 part using blocked, dormant, sequestered or encapsulated curing agents may be compounded employing known fillers, plasticizers, adhesive additives, U.V. stabilizers and the like. Application of the sealant to the desired substrate may be by standard methods as by extrusion from an applicator gun after mixing of the 2 part sealant with curing agent or activation of cure agent if necessary for the 1 part sealant. Or, if desired, the 1 part sealant cure may be activated after or during application as by known heat and/or moisture cures. Cast or molded objects may obviously be formed by pouring or injecting the compositions including any desired fillers, plasticizers or other adjuvants and allowing cure to take place. Conventional polysulfide and/or urethane processing techniques may be employed to produce rigid or flexible foams as well as rigid or elastomeric solids. Reaction injection molding and linear injection molding as conventionally understood are contemplated among the processes which may be employed. Coated objects may also be prepared by standard techniques as, for example, through the use of a roller coater, a curtain coater or application by brush. The choice of curing agent will obviously depend on the nature of the terminal groups. $NH_2$ and SH terminated polymers may be cured using polyfunctional compounds reactive with Zerewitinoff active hydrogen, such as epoxy compounds, polyisocyanates, poly basic acids or poly basic acid anhydrides or poly basic aryl halides and the like, polymers with isocyanate functionality will obviously be curable with standard polyurethane prepolymer cures employing commonly polyols and/or polyamines with or without catalysis. Polymers with $-SH$ terminals may be cured employing standard oxidative polysulfide polymer cure systems as, for example, $PbO_2$ or $ZnO_2$ and the like.

As used herein and the appended claims unless the context clearly requires otherwise the term substituted or unsubstituted aryl moiety carbocyclic and having 1 or 2 aromatic rings contemplates aromatic nucleii containing compounds such as benzene, naphthalene, indene, diphenyl, acenaphthene, fluorene either unsubstituted or substituted with such substituents as alkyl, alkenyl, alkynyl, aralkyl, aralkenyl, aralkynyl, fluorine-chlorine, bromine, acyl, alkylcarbonylalkyl, which may be exemplified by toluene, methylnaphthalene, dibenzyl, stilbene, indane, ethyl benzene, acetophenone, benzophenone, cumene, cyclohexylbenzene, styrene, diphenylmethane, chlorobenzene and the like. The term substituted or unsubstituted aryl moiety heterocyclic and having one or two aromatic rings contemplates aromatic nucleii containing heterocyclic compounds such as pyridine, quinoline, isoquinoline, indole, thiophene, furan, pyrrole, thiazole, oxazole, pyrazole, imidazole, benzimidazole, triazole, triazine, thiophthene, thianaphthene, benzofuran, indazole, pyridazine, pyrimidine, pyrazine, cinnoline, phthalazine, quinazoline, quinoxaline, chroman, coumarone either unsubstituted or substituted with such substituents as alkyl, alkenyl, alkynyl, aralkyl, aralkenyl, aralkynyl, fluorine, chlorine, bromine, acyl, alkylcarbonylalkyl, or carbonyl which may be exemplified by acetothiophene, dimethylpyrrole, dimethyloxazole, picoline, stilbazole, lepidine, furfural, ethyltriazine and the like. The term hydrocarbon, oxahydrocarbon or thiahydrocarbon radicals as set forth for compounds of formulas I, II, III, V, and VI contemplates those well known in the literature as suitable for the preparation of polysulfide polymers. U.S. Pat. No. 1,890,191 sets forth numerous examples of the type of bifunctional organic compounds which may be employed to provide these radicals in a typical polysulfide polymer reaction process. The term polyvalent aliphatic, aromatic, or aliphatic aromatic radical as set forth for compounds of formula II, III and VIII contemplates those at least difunction radicals commonly understood to be employed in low molecular weight organic polyisocyanates. Illustrative of these polyisocyanates and hence of R' are: isophorone diisocyanate, 1-methoxyphenyl-2,4-diisocyanate, 1-methyl-4-methoxyphenyl-2,5-diisocyanate, 1-ethoxyphenyl-2,4-diisocyanate, 1,3-dimethoxyphenyl-4,6-diisocyanate, 1,4-dimethoxyphenyl-2,5-diisocyanate, 1-propoxyphenyl-2,4-diisocyanate, 1-isobutoxy-2,4-diisocyanate, 1,4-diethoxyphenyl-2,5-diisocyanate toluene-2,4-diisocyanate, toluene-2,6-diisocyanate, diphenylether-2,4-diisocyanate naphthalene-1,4-diisocyanate, 1,1'-dinaphthalene-2,2'-diisocyanate, biphenyl-2,4-diisocyanate 3,3'-dimethylbiphenyl-4,4'-diisocyanate, 3,3'-dimethoxybiphenyl-4,4'-diisocyanate, diphenylmethane-4,4'-diisocyanate, diphenylmethane-2,4'-diisocyanate, diphenylmethane-2,2'-diisocyanate, 3,3'-dimethoxy diphenylmethane-4,4'-diisocyanate, benzophenone-3,3'-diisocyanate, ethylene diisocyanate, propylene diisocyanate, butylene diiosocyanate, pentylene diisocyanate, methylbutylene diisocyanate, tetramethylene diisocyanate, pentamethylene diisocyante, hexamethylene diisocyanate, dipropyl diisocyanate ether, heptamethylene diisocyanate, 2,2-dimethylpentylene diisocyanate, 3-methoxy-hexamethylene diisocyanate, octamethylene diisocyanate, 2,2,4-trimethylpentylene diisocyanate, 3-butoxyhexamethylene diisocyanate, 1,3-dimethylbenzene diisocyanate, 1,4-dimethylbenzene diisocyanate, 1,2-dimethylcyclohexane diisocyanate, 1,4-dimethylcyclohexane diisocyanate, 1,4-diethylbenzene diisocyanate, 1,4-dimethylnaphthalene diisocyanate, 1,5-dimethylnaphthalene diisocyanate, cyclohexane-1,3-diisocyanate, cyclohexane-1,4-diisocyanate, 1-methylcyclohexane-2,4-diisocyanate, 1-methylcyclohexane, 2,2-diisocyanate, 1-ethylcyclohexane-2,4-diisocyanate, dicyclohexylmethane-4,4'-diisocyanate, dicyclohexylmethylmethane-4,4'-diisocyanate, dicyclohexyldimethylmethane-4,4'-diisocyanate, 2,2-dimethyldicyclohexylmethane-4,4'-diisocyanate, 3,3',5,5'-tetramethyldicyclohexylmethane-4,4'-diisocyanate, 4,4'-methylenebis (cyclohexylisocyanate), ethylidene diisocyanate, 4,4'-diphenyl diisocyanate, dianisidine diisocyanate, 1,5-naphthalene diisocyanate, m-phenylene diisocyanate, isopropylidene bis(phenyl or cyclohexyl isocyanate), 1,3-cyclopentylene diisocyanate, 1,2-cyclohexylene diisocyanate, 1,4-cyclohexylene diisocyanate, 4,4',4''-triphenylmethane triisocyanate, 1,3,5-trisocyanatobenzene, phenylethylene diisocyanate, 1-chlorophenyl-2,4-diisocyanate, 1-nitrophenyl-2,4-diisocyanate, 1,3-dichlorophenyl-4,6-diisocyanate, 1,4-dichlorophenyl-2,5-diisocyanate, 1-chloro-4-methoxyphenyl-2,5-diisocyanate, 3,3'-dichlorodiphenyldimethylmethane-4,4'-diisocyanate, 3-nitrotriphenylmethane-4,4'-diisocyanate, pyrene-3,8-diisocyanate, chrysene-2,8-diisocyanate and the like.

The starting materials for the practice of the invention are commercially available, well known in the chemical literature or easily synthesized by methods well known to one silled in the art of chemistry.

One skilled in the art would also recognize that, in addition to compounds of the general formula VII illustrated hereinabove for the practice of the invention, one may employ compounds capable of generating equivalent chemical structures which may conveniently be illustrated as $[(H_2N)_a-Ar-S]^-$ under the conditions of the processes of the invention. Benzothiazole is typical of this class of compound, although many others will be readily apparent to a skilled organic chemist. As used herein and in the appended claims, compounds of the general formula VII comprehend the use of such compounds capable of generating equivalent structures as precursors in the processes of the invention.

The following examples further illustrate the best mode contemplated by the inventor for the practice of his invention.

EXAMPLE I

Preparation of Polysulfide Polymer Latex with Sulfur Rank of about 2.25

Neutral sodium polysulfide solution (2.43 molar, 2139.9 ml, 5.2 moles), sodium hydroxide solution (50% wt/wt, 25.6 g, 0.32 mole) and nekal BK (alkyl sulfonate, 5% aqueous solution, 20.0 g) are heated to about 85° C. under a nitrogen atmosphere. Aqueous magnesium chloride (25% $MgCl_2.6H_2O$, 0.16 mole, 130 g) is added and bis-(2-chloroethyl) formal (720.0 g, 4.0 moles) is added over a period of 1 hour while the temperature is held at about 84° C. to about 87° C. after which the mixture is held at about 100° C. for an additional hour while the $N_2$ blanket is maintained. The reaction mixture is then allowed to cool to room temperature, and the solids permitted to settle. After decantation of the supernatant liquid, the solids are washed by decantation until the wash water gives a negative lead acetate test to give the title product 668 grams. A dried filter cake of the latex gives the following results:

Analysis for Sulfur=38.76%
Sulfur Rank=2.16

ASTM D2240 Hardness (Shore A)=27 reaching 20 in 2 seconds

EXAMPLE 2

Reaction of Polysulfide Polymer Latex of Example 1 with Diaminodiphenyl Disulfide and Subsequent Reaction With Toluene Diisocyanate A. To the latex product of Example 1 (36.1% Solids, 277.0 g [100 g dry]) is added 6.23 g diamino diphenyl disulfide as a powder. The mixture is heated under nitrogen at about 95° C. for about 7 hours, allowed to stand overnight at room temperature and then treated for an additional 8 hours at about 95° C., then allowed to cool and stand at room temperature for about 72 hours. An aliquot sample is taken and made acid by addition of acetic acid. A second liquid phase separates indicating that splitting of the high molecular weight polymer chains has occurred. Toluene diisocyanate (4.36 g) is added to the reaction mixture and the reaction allowed to proceed 4 hours at room temperature. During this time an exotherm from 23° to 26.5° C. occurs. Acidification of a sample produces a crumb-like solid precipitate indicating reaction back to a high molecular weight polymer. Durometer readings on solid material are variable but over 60 Shore A.

B. To the product latex from Example 1 (36.1% Solids, 277.0 g [100.0 g dry]) is added diamino diphenyl disulfide (6.23 g) in toluene (50 g). The mixture is heated under a nitrogen blanket at about 78° C. for about 6 hours, allowed to cool and stand at room temperature overnight, heated for an additional 8 hours at about 80° C., allowed to cool and sampled. Acidification of the sample with acetic acid causes separation of a second liquid phase indicating that the original high molecular weight polymer has been split to a lower molecular weight. Toluene diisocyanate (Hylene TM, Du Pont) is added to the remaining reaction mixture. Reaction is allowed to proceed for about 4 hours. During this time, a slow exotherm from 24° C. to 26° C. occurs. Acidification of a sample gives a solid crumb precipitate indicating chain extension to a high molecular weight. After removing the majority of toluene by distillation and washing the solid latex with water, a durometer reading is made on a cake held at 100° C. overnight. The cake has a Shore A hardness of 55 dropping to 50 in 2 seconds.

EXAMPLE 3

Preparation of and Splitting of Polysulfide Latex with Diamino Diphenyl Disulfide and Reaction of the Low Molecular Weight Product with Toluene Diisocyanate Following a procedure analogous to that of Example 1 but adding additional free sulfur to adjust the rank of the starting polysulfide solution to 2.25, there is prepared a rank 2.14 polysulfide latex which is held at 100° C. to "toughen" the polymer. The durometer hardness of a sample prepared from the latex is 50 Shore A.

To this latex (33.6% Solids, 2381 g [800 g dry]) there is added diaminophenyl disulfide (49.84 g, 1 mole per 22 segment weights of polymer so as to split to average 4000 M. Wt. segments) in absolute methanol (720 g) over a 32 minute period during which time the reaction mixture is heated from an initial 25° C. up to reflux temperature. The reaction is held at reflux for about 4 hours, allowed to cool and settle and the residue washed with water 5 times by decantation. A sample (115.05 g dry) is washed 10 additional times by the same technique, then treated with toluene diisocyanate (4.66 g). After 4 hours, hardness on a sample of the reaction is 68 (Shore A). The remaining latex from the diamino diphenyl disulfide reaction is acidified with acetic acid and washed to about neutrality. The product obtained is a liquid (719.2 g) viscosity=2220.0 poises.

EXAMPLE 4

Preparation of Rank 2.25 Latex, Stripping to Rank 2.0 Followed by Conversion to Amine Terminated Liquid Polymer Following a procedure analogous to that of Examples 1 and 3, a 2.18 rank polysulfide latex is prepared from $Na_2S$ 2.25 (4.2 moles) $Na_2S$ (2.3 moles) Sulfur (2.9 moles) and bis (dichloroethyl) formal (5.0 moles) and washed free of sulfide ion to lead acetate. To the latex at 85° C. is added 200 g $Na_2SO_3$ and the mixture is held at 85° C. for 1 hour. The stripped latex is then washed by dectantation. The sulfur rank found is 1.90. Hardness of cakes prepared from the latex both before and after stripping is 50 Shore A. The latex itself is 33.6% solids.

To the latex (2244.0 g, 754.0 g dry) is added diamino diphenyl disulfide (47.0 g) in methanol (679 g) over a period of 30 minutes while the reaction mixture is being warmed to reflux. Reflux is maintained for 4 hours. At the end of this time, the reaction misture is allowed to cool and is divided into 2 portions. The first portion, part A, is washed twice be decantation then acidified with acetic acid. The lower layer organic phase which separates is washed 10 times with about equal volume portions or water. Following washing the organic phase is heated in a rotary evaporator at about 85° C. until a constant 1–2 mm Hg vacuum is reached. Viscosity=2300 poises at 25° C., %N=0.44% 500 g removed from the original stripped latex, part B, is washed 10 times by decantation with approximately equal volumes of water. Dry solids at this point=127.7 g.

The washed latex is treated at 23° to 26° C. with 5.2 g toluene diisocyanate. Hardness of a sample "cake" from the reaction is 70 Shore "A". % Sulfur found is 34.33%.

EXAMPLE 5

Introduction of Aryl Amine Terminals Simultaneously With Polysulfide Polymer Synthesis To a mixture of $Na_2S.9H_2O$ (1372.8 g), sulfur (228.6 g) and water (110 g) which has been warmed to 75° C. and held at that temperature for about ½ hour under a nitrogen blanket is added NaOH (50% w/w in water, 25.6 g) and a sodium alkyl sulfonate (Nekal BX, 20.0 g) after which the mixture is warmed to 85° C. and $MgCl_2.6H_2O$ (130.1 g) and p-chloronitrobenzene (54.2 g) are added. A slight warming to 95° C. occurs. When the reaction mixture has again been stabilized at 85° C. bis-(2 chloroethyl) formal (720.0 g) is added over a period of one hour. After all the formal has been added the reaction is held at 100° C. for 7 hours while sampling every hour including 0 time for 3 hours then at 5 and 7 hours. Each sample and the final batch of latex is washed clean of sulfide (lead acetate test) a portion of the final washed latex is reserved for reaction with toluene diisocyanate. Each sample and the remainder of the main batch of latex are acidified with 50% aqueous acetic acid then washed free of acid by decantation and dried under vacuum. Viscosity at 25° C.=4700 poise.

The portion of the latex reserved for reaction with toluene diisocyanate (60.7 g dry solids) is treated with toluene diisocyanate (2.4 g) for 4 hours at about 22° to 24° C. A durometer hardness cake is then prepared and dried overnight at 70° C. A solid tough rubber is obtained of 60 Shore A hardness. % Sulfur=35.5%.

The washed liquid polymer (20.0 g) from the major portion of the latex is treated with toluene diisocyanate (0.824 g) at room temperature then the mixture is divided into 2 parts. 1 part is cured at room temperature (23° C.), the other is held at 100° C. The room temperature sample is soft cured at 1 hour with a durometer of 35 Shore A falling to 26 in 2 seconds after 24 hours and 52 Shore A falling to 47 after 7 days at room temperature. After 16 hours at 100° C. that sample has a hardness of 67 Shore A.

Analysis of the reaction sample gives the following results.

| Time | % C | % H | % N | % Amine N |
|---|---|---|---|---|
| 0 hr. | 36.52 | 5.86 | 0.37 | 0.34 |
| 1 hr. | 36.53 | 5.78 | 0.37 | 0.38 |
| 2 hrs. | 36.78 | 5.79 | 0.37 | 0.45 |
| 3 hrs. | 36.40 | 5.67 | 0.41 | 0.41 |
| 5 hrs. | 36.17 | 5.79 | 0.35 | 0.42 |
| 7 hrs. (Final) | — | — | 0.62 | 0.50 |

EXAMPLE 6

Reaction with Amino Terminated Polysulfide Polymer With Liquid Epoxy Polymer

The amine terminated liquid polymer of Example 3 is treated with the proportions by weight of Epoxy polymer (Epon 828, Shell Chemical Co.) at the temperatures indicated for the time indicated or until cure is obtained.

| Ratio Amine Term Polymer to Epon 828 | Temp. | Time to Cure | Cured Hardness (Shore A) |
|---|---|---|---|
| 2/1 | 23° C. | None in 10 days | — |
| 2/1 | 70° C. | None in 10 days | — |
| 2/1 | 100° C. | 54 to 70 hours | soft, slightly tacky |
| 2/1 | 150° C. | partial 6½ hrs. full 7 hrs. | ~60 |
| 4/1 | 23° C. | None in 10 days | — |
| 4/1 | 70° C. | Cure in 22 days | — |
| 4/1 | 100° C. | 48 hours | 10 |
| 4/1 | 150° C. | 6¼ hours | 42 |

EXAMPLE 7

Cure of Amine Terminated Polysulfide Polymer With An Isocyanate Endcapped Polyether Two portions of the amine terminated polymer from Example 3 (56.0 g, 0.01 mole) are treated with portions of an isocyanate (toluene diisocyanate) endcapped poly(propylene glycol) (3.485% NCO, 2410 Mol. Wt.) (24.1 g, 0.01 mole) at 100° C. and 150° C. At 150° C. cure of the major portion to a solid occurs within 1 hour some residual liquid polymer remains on surface. Treatment at 150° C. overnight gives a dark brown, soft, tacky material with an $H_2S$ odor.

At 100° C. cure is obtained between 4 and 19 hours to a solid with a tacky surface and a hardness of about 35 Shore A.

EXAMPLE 8

Aryl Amine Terminated Liquid Polysulfide Polymers of about 4000 M. Wt. by Direct Synthesis To sodium polysulfide ($Na_2S_{2.25}$) (1.94 molar, 1608.0 mls, 3.02 moles) and Nekal BX (20.0 g) at 85° C. under nitrogen is added $MgCl_2.6H_2O$ (0.12 moles, 98.1 g) and p-chloronitrobenzene (0.345 moles, 54.5 g). The reaction mixture is cooled to 85° C. and bis-(2-chloroethyl) formal (2.0 moles, 360.0 g) is added over a 1 hour period while the temperature is maintained at 85°–90° C. After all the bis-(2-chloroethyl) formal has been added, the reaction mixture is warmed to 100° C. and held at that temperature for about 6 hours. After cooling, the latex is allowed to settle and the precipitate is washed 6 times with about 2 liter portions of fresh water by decantation. The wash water on the 5th wash is acidified with 50% acetic acid to a pH of between 5 and 6. After washing, the precipitate is dried on a rotary evaporator at 0.25 mm Hg and 90° C. max temperature to give a liquid residue 360.4 g, viscosity 1512.0 poises, N (as amine N)=0.78%—M. Wt. 4102.6. N (by nicro analysis)=0.83%, S=37.83%. 41.03 g residue is treated with 1.74 g toluene diisocyanate. A solid is obtained in 25 minutes at room temperature. Hardness=75 Shore A. After 8 days—80 Shore A.

EXAMPLE 9

Preparation of about 1,000 Molecular Weight Amine Terminated Polysulfide Polymer by Direct Synthesis Following a procedure analogous to that of Example 8, there is obtained from 1928.0 ml of 1.94 molar $Na_2S_{2.25}$ 409.0 g of the title product as a liquid residue viscosity 450.0 poises N as amine N=1.79%

N total=1.83%

Sulfur=37.43%

Toluene diisocyanate (3.5 g) and the residue (35.8 g) are mixed. The mixture becomes warm and cures in about 6 minutes. Hardness after 24 hours at room temperature=90 Shore A.

EXAMPLE 10

Preparation of an Aryl Amine Terminated Liquid Polymer of about 3000 Molecular Weight Followed by Cleavage to Lower Molecular Weight Polymer Having Both Thiol and Aryl Amine Terminals To $Na_2S_{2.25}$ solution (1.94 molar, 2.93 moles, 1510 ml) and Nekal BX (20.0 g) heated to 85° C. under $N_2$ is added $MgCl_2.6H_2O$ (92.1 g) and p-chloronitrobenzene (35.2 g) followed by bis-(2-chloroethyl) formal (360.0 g) over a period of about 1 hour. After heating at 100° C. for 6 hours the reaction is allowed to cool and washed by decantation until a negative lead acetate sulfide test is obtained from the wash water. To the washed latex (20–25% solids) is then added NaSH (8.0 g) and $Na_2SO_3$ 150.0 g and the mixture warmed to 85° C. for about 1.5 hours. $NaHSO_3$ (50 g) is then added to bring the pH of the mixture to about 7 and the mixture is heated a further 0.5 hour. The reaction is then allowed to cool and settle. The precipitate is washed by decantation until the wash water is free of $SO_3^=$ by iodine test and then acidified with acetic acid to about pH 5. The residue which separates as a lower layer is partitioned from the aqueous layer and dried in a rotary evaporator at 90° C. and 0.5 mm Hg 302.0 g, viscosity 420.0 poises.

Amine nitrogen=0.52%
Total nitrogen=0.54%
Sulfur=34.70%
SH=1.49%
Sulfur rank=1.81%

Treatment of this residue with PbO$_2$ powder in fashion sufficient to cure usual all thiol terminated liquid polysulfide polymers does not effect cure. A mixture of residue (30.8 g) and toluene diisocyanate (0.87 g) warms slightly when mixed at room temperature but does not cure to a solid in one hour.

A mixture of residue (30.8 g), toluene diisocyanate (0.87 g) and PbO$_2$ powder (2.0 g) warms slightly and cures to a solid in 18 minutes. Hardness after 2 hours at room temperature is 25 Shore A with flow. Hardness after 8 days at room temperature is 60 Shore A with slight flow.

EXAMPLE 11

Preparation of a Liquid Polysulfide Polymer with Hydroxyl Terminals, its Endcapping with Toluene Diisocyanate and Use of the Isocyanate Capped Prepolymer to Cure an Amine Terminated Polysulfide Polymer A liquid thiol terminated polysulfide polymer based on bis-(2-chloroethyl) formal with 2% crosslinking, of about 1000 molecular weight is dried for 1 hour at 91° C. and 0.2 mm Hg. After cooling to about 67° C. H$_2$SO$_4$ (1.0 g) is added and the mixture stirred for about one hour at a temperature range of 62° to 80° C. When the temperature of the mixture is at 62° C. toluene diisocyanate (Hylene TM 435.4 g) is added. The temperature is maintained at about 90° to 95° C. for about 5 hours. The product on cooling contains 8.01% NCO. It is stored in closed containers under nitrogen.

The amine terminated polymer of Example 9 (14.9 g) and the above product (10.0 g) are mixed at room temperature. Cure to a solid occurs in 8 minutes.

Hardness after 2 hours=72 falling to 68 in 2 seconds.

After 3 days at room temperature hardness=74 Shore A

After 3 days in 100° C. oven, darkened, hardness=78 Shore A.

EXAMPLE 12

Aryl amine terminated liquid polymers prepared analogously to those described in Examples 9 and 10 with the % amines shown are cured using a 1:1 NCO/amine ratio with PAPI 135 (a polymeric [4 isocyanate phenyl] methane having a functionality of about 2.7 and a molecular weight of 135 sold by Upjohn and Co.) using the quantities indicated to obtain cured products within the time shown having the properties shown:

| Amine terminated polymer A (0.94% Amine) | 23.55g | — | — |
|---|---|---|---|
| Amine terminated polymer B (2.03% Amine) | — | 21.79g | — |
| Amine terminated polymer C (3.24% Amine) | — | — | 20.5g |
| PAPI 135 | 2.0g | 4.0g | 6.0g |
| Cure Time Rm. Temp. (min.) | 4.0 | 1.0 | 0.5 |
| Hardness (Shore A) | | | |
| 3 hrs. Rm. Temp. | 75 | 95 | 100 |
| 3 days Rm. Temp. | 82 | 95 | 100 |

EXAMPLE 13

The aryl amine terminated polymers employed in Example 12 are treated at the temperature indicated with a toluene diisocyanate endcapped polyethylene adipate prepolymer having 3.05% NCO using the quantities shown to obtain cured products with the properties shown:

| Amine terminated polymer A | 123.6g | — | — |
|---|---|---|---|
| Amine terminated polymer B | — | 57.2g | — |
| Amine terminated polymer C | — | — | 35.9g |
| Isocyanate terminated prepolymer | 100.0g | 100.0g | 100.0g |
| Cure Time at Rm. Temp. | 4 hrs. | 1 hr. 10 min. | 1 hr. |
| Cure Time at 70° C. | 1 hr. 50 min. | 25 min. | 25 min. |
| 24 hour Shore A Hardness | | | |
| Rm. Temp. Cure | 35 to 25 (2 sec) | 53 (sl tack) | 58 (sl tack) |
| 70° C. Cure | 55 | 55 | 62 |

EXAMPLE 14

Reaction of a Commercial Thiol Terminated Liquid Polysulfide Polymer Based on Bis-(2-chloroethyl) Formal Having About 4000 Molecular Weight, And About 2% Crosslinking With 4,4'-diaminodiphenyl disulfide, Reaction of Aryl Amine Thiol Terminated Polymer With Toluene Diisocyanate And Cure Of The Resulting Thiol Terminated Urethane Polysulfide Polymer The liquid polysulfide polymer (400.0 g) and 4,4'-diaminodiphenyl disulfide (24.8 g) are warmed at 90° to 95° C. under N$_2$ for about 4 hours. This material so formed when treated with PbO$_2$ gives a soft solid that reverts to liquid overnight. After cooling, to a portion of the reaction mixture (212.4 g) is added toluene diisocyanate (8.71 g), the temperature climbs from 25° C. to about 60° C. in 1 hour. Application of slight heat raises the temperature to about 77° C. The reaction mixture becomes very viscous and gells on cooling. A portion cured with PbO$_2$ before complete gellation gives a hardness of about 55 Shore A.

EXAMPLE 15

Preparation of Aryl Amine Thiol Terminated Liquid Polysulfide Polymer From Diaminodiphenyl Disulfide and 2% Crosslinked, 4000 Molecular Weight Bis-(2-chloroethyl) Formal Thiol Terminated Polysulfide Polymer 4,4'-Diaminodiphenyl disulfide (99.7 g) and the thiol terminated polysulfide polymer (1600.0 g) are warmed at 91° to 95° C. for 4 hours under N$_2$. The product obtained on cooling has SH=1.71%, N=0.49%.

EXAMPLE 16

Reaction of Aryl Amine Thiol Terminated Liquid Polysulfide Polymer With Liquid Isocyanate Terminated Polyether Polymer The aryl amine thiol terminated liquid polysulfide polymer of Example 15 (849.6 g) and a liquid polymer prepared by endcapping a 2000 M.Wt. poly(propylene glycol) with toluene diisocyanate (Hylene TM, Du Pont Co.) to a final NCO content of 3.43% (490.0 g) are held at 85° to 95° C. of 2.5 hours. Upon cooling the product is a brown paste. Treatment of a sample with PbO₂ results in a solid having 45 Shore A hardness in less then 15 minutes.

Analysis of the product:
NCO=0.035%
SH=1.09%
S=22.8%

EXAMPLE 17

Preparation of Sealant Compositions from the Thiol Terminated Urethane Polysulfide Polymer of Example 16

Sealant compositions are prepared by blending the ingredients listed in the quantities shown in parts by weight. The work life and physical properties obtained are also listed.

|  | Formulation No. | | | | | | | | |
| --- | --- | --- | --- | --- | --- | --- | --- | --- | --- |
|  | 1 | 2 | 3 | 4 | 5 | 6 | 7 | 8 | 9 |
| Polymer (Ex 16) | 100 | 100 | 100 | 100 | 100 | 100 | 100 | 100 | 100 |
| CaCO₃ | 65 | 50 | 65 | 38 | 45 | 55 | 55 | 65 | 65 |
| Regency #7 = (?) | — | — | — | 27 | 20 | 20 | 20 | — | — |
| Flx 0012 = (?) | 60 | 60 | 70 | 60 | 60 | 70 | 70 | 60 | 60 |
| Silane A-187 | 0.7 | 0.7 | 0.7 | 0.7 | 0.7 | 0.7 | 0.7 | 0.7 | 0.7 |
| TiO₂ | 10 | 10 | 10 | 10 | 10 | 10 | 10 | 10 | 10 |
| Thixcin GR | 10 | 10 | 10 | 10 | 10 | 10 | 10 | 10 | 10 |
| PbO₂ (7)/Flx 0012 (6.5)/Pb Stearate (6.5) | 14 | 14 | 14 | 14 | 14 | 14 | 14 | 14 | 14 |
| Pb Stearate | — | — | — | — | — | — | — | 0.25 | 0.5 |
| Toluene | 5 | — | — | — | — | 5 | — | 5 | 5 |
| Work Life Mins | 35 | 25 | 28 | 30 | 25 | 30 |  | 45 | 70 |
| Hardness Shore A |  |  |  |  |  |  |  |  |  |
| 1 day | 25 | 22 | 20 | 23 | 24 | 21 |  | 22 | 21 |
| 7 days | 32 | 30 | 25 | 31 | 32 | 30 |  | 30 | 32 |
| Vertical Sag (ins) | 0 | 0 | 0 | 3/16 | 0 | 0 |  | 0 | 0 |
| Tensile (psi) | 75 | 80 | 90 | 80 | 80 | 70 |  | 80 | 80 |
| Elongation (%) (Est.) | 400 | 800 | 400 | 700 | 500 | 500 |  | 700 | 700 |

EXAMPLE 18

Preparation of Aryl Amine Terminated Liquid Polymer of About 4000 Molecular Weight followed by Disulfide-Mercaptan Group Interchange Resulting in Polymer Having both Thiol and Aryl Amine Terminals A 100 grams of aryl amine liquid polymer made by the process described in example 8 is mixed with 100 grams of 4000 molecular weight polysulfide liquid polymer with all thiol terminals and having 0.5% crosslinking. This results in a homogeneous solution of one polymer in the other which then is heated to 90° C. and is held at that temperature for 10 hours. This treatment results in an interchange of terminal thiol groups with polysulfide groups along the chain forming new polymeric molecules with an average of one thiol terminal and one aryl amine terminal. About 200 grams of product is obtained.

When a sample of this product is treated with PbO₂ the liquid polymer becomes more viscous but does not cure. Analysis for thiol and aryl amine groups shows that practically no thiol groups are present and that the calculated amount of aryl amine groups are still substantially present as the only polymer terminals. When a stoichiometric quantity of toluene diisocyanate is added corresponding to the aryl amine groups the polymer solidifies to a soft solid in about two hours at room temperature.

EXAMPLE 19

Preparation of Amine Terminated Polysulfide Polymers Employing Benzothiazole as a Precursor for the Terminals Following a procedure analogous to that of Example 5 there is obtained from 1.30 moles of 2.0 molar aqueous Na₂S₂.₂₅ solution, 0.10 moles benzothiazole and 1.0 mole bis-(2-chloroethyl) formal (added at 95° C. to 100° C.) the title product as a clear liquid having about 1.4% nitrogen content and having an amino content closely corresponding to the total nitrogen content.

The subject matter which applicant regards as his invention is particularly pointed out and distinctly claimed as follows:

1. A compound of the formula:

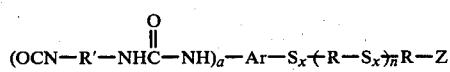

wherein Ar is an a+1 valent radical derived by removal of a+1 nuclear hydrogens from a substituted or unsubstituted aryl moiety either carbocyclic or heterocyclic and having 1 or 2 aromatic rings; R is a hydrocarbon, oxahydrocarbon, or thiahydrocarbon radical; a is 1 or 2; n is about 4 to about k×10³ wherein k is 1 to about 10 and x is from 1.8 to about 4; and Z is

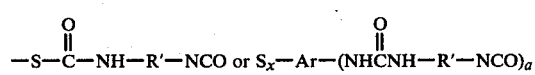

and R' is a polyvalent aliphatic, aromatic or aliphatic aromatic radical or when taken together with the

and NCO moieties is the residue of an isocyanate terminated polyurethane prepolymer.

2. A compound of the formula:

$$HS-R(S_x-R)_nS_x-R-S_x-AR-NH-\overset{\overset{O}{\|}}{C}-NH$$
$$\underset{\underset{HS-R(S_x-R)_mS_x-R-S_x-Ar-NH-C=O}{|}}{\overset{|}{\underset{NH}{|}}}$$

wherein Ar; R; R'; n and x are as defined in claim 5 and m is about 4 to about k×10³ wherein k is about 1 to 10.

3. A process for the preparation of a compound of the formula:

$$(OCN-R'-NH\overset{O}{\overset{\|}{C}}-NH)_a-Ar-S_x(R-S_x)_nR-Z$$

wherein Z is $$-S-\overset{O}{\overset{\|}{C}}-NH-R'-NCO \text{ or } -S_x-Ar-(NH\overset{O}{\overset{\|}{C}}NH-R'-NCO)_a;$$

R' is a polyvalent aliphatic, aromatic or aliphatic aromatic radical or when taken together with the $$-\overset{O}{\overset{\|}{C}}NH$$

and —NCO moieties is the residue of an isocyanate terminated polyurethane prepolymer; Ar is an a+1 valent radical derived by removal of a+1 nuclear hydrogens from a substituted or unsubstituted aryl moiety either carbocyclic or heterocyclic and having 1 or 2 aromatic rings; R is a hydrocarbon, oxahydrocarbon, or thiahydrocarbon radical; a is 1 or 2; n is about 4 to about k×10³ wherein k is 1 to about 10, and x is from 1.8 to about 4; which comprises treating a compound having the formula $$(H_2N)_a-Ar-S_x-(R-S_x)_nR-Y$$

wherein Y is —SH or —$S_x$—Ar—$(NH_2)_a$ and Ar, R, a, n and x are as previously defined, with a compound of the formula:

OCN—R'—NCO wherein R' is as previously defined.

4. A process for the preparation of a compound of the formula:

$$HS-R(S_x-R)_n-S_x-R-S_x-Ar-NH-\overset{O}{\overset{\|}{C}}-NH$$
$$\underset{\underset{HS-R(S_x-R)_m-S_x-R-S_x-Ar-NH-\overset{\|}{\underset{O}{C}}-NH}{|}}{\overset{|}{R'}}$$

wherein Ar is an a+1 valent radical derived by removal of a+1 nuclear hydrogens from a substituted or unsubstituted aryl moiety either carbocyclic or heterocyclic and having 1 or 2 aromatic rings; R is a hydrocarbon, oxahydrocarbon, or thiahydrocarbon radical; a is 1 or 2; n is about 4 to about k×10³ wherein k is 1 to about 10 and x is from 1.8 to about 4; R' is a polyvalent aliphatic, aromatic or aliphatic aromatic radical or when taken together with the $$-\overset{O}{\overset{\|}{C}}NH$$

and NCO moieties is the residue of an isocyanate terminated polyurethane prepolymer and m is about 4 to about k×10³ wherein k is 1 to about 10 which comprises treating a compound of the formula:

$$(H_2N)_a-Ar-S_x(R-S_x)_nR-Y$$

wherein Ar; R; a; n; and x are as defined above; and Y is SH with an approximate stoichiometric equivalent to the amine functionality of a compound of the formula:

OCN—R'—NCO.

5. A process for the preparation of a compound of the formula:

$$(OCN-R'-NH\overset{O}{\overset{\|}{C}}-NH)_a-Ar-S_x(R-S_x)_nR-Z$$

wherein Z is $$-S-\overset{O}{\overset{\|}{C}}-NH-R'-NCO \text{ or } -S_x-Ar-(NH\overset{O}{\overset{\|}{C}}NH-R'-NCO)_a;$$

R' is a polyvalent aliphatic, aromatic or aliphatic aromatic radical or when taken together with the $$-\overset{O}{\overset{\|}{C}}NH$$

and —NCO moieties is the residue of an isocyanate terminated polyurethane prepolymer; Ar; R; a; n and x are as defined below which comprises treating a compound of the formula:

$$(H_2N)_a-Ar-S_x-R-S_x)_nR-Y$$

wherein Y is —SH or —$S_x$—Ar—$(NH_2)_a$; Ar is an a+1 valent radical derived by removal of a+1 nuclear hydrogens from a substituted or unsubstituted aryl moiety either carbocyclic or heterocyclic and having 1 of 2 aromatic rings; R is a hydrocarbon, oxahydrocarbon, or thiahydrocarbon radical; a is 1 or 2; n is about 4 to about k×10³ wherein k is 1 to about 10 and x is from 1.8 to about 4, with a compound of the formula:

OCN—R'—NCO.

* * * * *

UNITED STATES PATENT AND TRADEMARK OFFICE
CERTIFICATE OF CORRECTION

PATENT NO. : 4,376,193
DATED : March 8, 1983
INVENTOR(S) : Eugene R. Bertozzi

It is certified that error appears in the above—identified patent and that said Letters Patent is hereby corrected as shown below:

Column 10, line 29, "silled" should read --skilled --.

Column 13, line 32, after "Reaction", "with" should read --of--.

Column 16, line 18, "tO" should read --to--.

Column 19, line 10, "5" should read --1--.

Column 20, line 51, that portion of the formula reading "$S_x-R-S_x)_nR$" should read --$S_x(-R-S_x-)_nR$--.

Signed and Sealed this

Thirteenth Day of August 1985

[SEAL]

Attest:

DONALD J. QUIGG

Attesting Officer

Acting Commissioner of Patents and Trademarks